United States Patent
Tsubaki

(10) Patent No.: US 10,300,940 B2
(45) Date of Patent: May 28, 2019

(54) ELECTRIC POWER STEERING APPARATUS

(71) Applicant: NSK Ltd., Tokyo (JP)

(72) Inventor: Takahiro Tsubaki, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/552,323

(22) PCT Filed: Feb. 10, 2017

(86) PCT No.: PCT/JP2017/004866
§ 371 (c)(1),
(2) Date: Aug. 21, 2017

(87) PCT Pub. No.: WO2017/145797
PCT Pub. Date: Aug. 31, 2017

(65) Prior Publication Data
US 2018/0354549 A1    Dec. 13, 2018

(30) Foreign Application Priority Data

Feb. 24, 2016 (JP) .................................. 2016-032587
Feb. 24, 2016 (JP) .................................. 2016-032588

(51) Int. Cl.
| | |
|---|---|
| B62D 5/04 | (2006.01) |
| H02P 29/024 | (2016.01) |
| H02P 29/028 | (2016.01) |
| H02P 25/22 | (2006.01) |

(52) U.S. Cl.
CPC ......... *B62D 5/0463* (2013.01); *B62D 5/0481* (2013.01); *B62D 5/0487* (2013.01); *H02P 29/024* (2013.01); *H02P 29/028* (2013.01); *H02P 25/22* (2013.01)

(58) Field of Classification Search
None
See application file for complete search history.

(56) References Cited

U.S. PATENT DOCUMENTS

| | | | |
|---|---|---|---|
| 2011/0286244 A1 | 11/2011 | Wei et al. | |
| 2016/0006387 A1* | 1/2016 | Nakamura | H02P 29/032 701/43 |
| 2016/0036296 A1* | 2/2016 | Kabune | H02K 11/33 180/446 |

(Continued)

FOREIGN PATENT DOCUMENTS

| | | |
|---|---|---|
| JP | 2015-039256 A | 2/2015 |
| JP | 2015-097472 A | 5/2015 |
| JP | 2016-021803 A | 2/2016 |

OTHER PUBLICATIONS

Written Opinion of the International Searching Authority of PCT/JP2017/004866 dated May 9, 2017.

*Primary Examiner* — Richard M Camby
(74) *Attorney, Agent, or Firm* — Sughrue Mion, PLLC

(57) ABSTRACT

An electric power steering apparatus that can suppress deterioration of steering feeling by changing a current command value of a normal system in motor control by two systems when an abnormality occurs in any of the systems. The steering apparatus calculates a current command value to a motor having two-system motor windings for each system, comprises a current command value adjusting section that calculates the current command value by using a steering assist command value and a compensation current command value.

8 Claims, 12 Drawing Sheets

(56) References Cited

U.S. PATENT DOCUMENTS

| | | |
|---|---|---|
| 2016/0200355 A1 | 7/2016 | Mori et al. |
| 2016/0229447 A1* | 8/2016 | Wada .................. B62D 5/0463 |
| 2017/0029022 A1* | 2/2017 | Nakamura ........... B62D 5/0409 |
| 2017/0104437 A1* | 4/2017 | Suzuki ................ B62D 5/0475 |

* cited by examiner

PRIOR ART

PRIOR ART

ELECTRIC POWER STEERING APPARATUS

CROSS REFERENCE TO RELATED APPLICATIONS

This application is a National Stage of International Application No. PCT/JP2017/004866 filed Feb. 10, 2017, claiming priority based on Japanese Patent Application No. 2016-032587 filed Feb. 24, 2016 and Japanese Patent Application No. 2016-032588 filed Feb. 24, 2016, the contents of all of which are incorporated herein by reference in their entirety.

TECHNICAL FIELD

The present invention relates to an electric power steering apparatus that assists and controls a steering system by calculating current command values to a motor having two-system motor windings for respective systems and driving the motor on the basis of the current command values, and in particular to an electric power steering apparatus that suppresses deterioration of steering feeling by changing the current command value of a normal system when an abnormality occurs in any of the systems.

BACKGROUND ART

An electric power steering apparatus (EPS) which provides a steering system of a vehicle with a steering assist torque (an assist torque) by means of a rotational torque of a motor, applies a motor driving force controlled with an electric power supplied from an inverter as the steering assist torque to a steering shaft or a rack shaft by means of a transmission mechanism such as gears. In order to accurately generate the steering assist torque, such a conventional electric power steering apparatus performs feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of a duty ratio of pulse width modulation (PWM) control. A brushless motor that is superior in durability and serviceability and has little noise, is commonly used as the motor.

A general configuration of the conventional electric power steering apparatus will be described with reference to FIG. 1. As shown in FIG. 1, a column shaft (a steering shaft, a handle shaft) 2 connected to a steering wheel 1 is connected to steered wheels 8L and 8R through reduction gears 3 in a reducing section, universal joints 4a and 4b, a rack and pinion mechanism 5, tie rods 6a and 6b, further via hub units 7a and 7b. In addition, the column shaft 2 is provided with a torque sensor 10 for detecting a steering torque Ts of the steering wheel 1 and a steering angle sensor 14 for detecting a steering angel θ, and a motor 20 for assisting the steering force of the steering wheel 1 is connected to the column shaft 2 through the reduction gears 3. Electric power is supplied to a control unit (ECU) 30 for controlling the electric power steering apparatus from a battery 13, and an ignition key signal is inputted into the control unit 30 through an ignition key 11. The control unit 30 calculates a current command value of an assist (steering assist) command based on the steering torque Ts detected by the torque sensor 10 and a vehicle speed Vs detected by a vehicle speed sensor 12, and controls a current supplied to the motor 20 for EPS based on a voltage command value Vref obtained by performing compensation and so on with respect to the current command value.

Further, the steering angle sensor 14 is not indispensable and may not be provided, and it is possible to obtain the steering angle from a rotational position sensor such as a resolver connected to the motor 20.

A controller area network (CAN) 40 to exchanging various information of a vehicle is connected to the control unit 30, and it is also possible to receive the vehicle speed Vs from the CAN 40. Further, it is also possible to connect a non-CAN 41 exchanging a communication, analog/digital signals, a radio wave or the like except the CAN 40 to the control unit 30.

The control unit 30 mainly comprises a CPU (including an MCU, an MPU and so on), and general functions performed by programs within the CPU are shown in FIG. 2.

Functions and operations of the control unit 30 will be described with reference to FIG. 2. As shown in FIG. 2, the steering torque Ts detected by the torque sensor 10 and the vehicle speed Vs detected by the vehicle speed sensor 12 (or from the CAN 40) are inputted into a current command value calculating section 31 calculating a current command value Iref1. The current command value calculating section 31 calculates the current command value Iref1 that is a control target value of a current supplied to the motor 20 based on the steering torque Ts and the vehicle speed Vs that have been inputted and by means of an assist map or the like. The current command value Iref1 is inputted into a current limiting section 33 through an adding section 32A. A current command value Irefm the maximum current of which is limited is inputted into a subtracting section 32B, and a deviation I (Irefm−Im) between the current command value Irefm and a motor current value Im being fed back is calculated. The deviation I is inputted into a PI-control section 35 for improving a characteristic of the steering operation. The voltage command value Vref whose characteristic is improved by the PI-control section 35 is inputted into a PWM-control section 36. Furthermore, the motor 20 is PWM-driven through an inverter 37 serving as a driving section. The motor current value Im of the motor 20 is detected by a motor current detector 38 and is fed back to the subtracting section 32B. The inverter 37 uses field effect transistors (FETs) as driving elements and is comprised of a bridge circuit of FETs.

A rotational position sensor 21 such as a resolver is connected to the motor 20, and a motor rotational angle θe is outputted from the rotational position sensor 21.

A compensation signal CM from a compensation signal generating section 34 is added to the adding section 32A, and a characteristic compensation of the steering system is performed by the addition of the compensation signal CM so as to improve a convergence, an inertia characteristic and so on. The compensation signal generating section 34 adds a self-aligning torque (SAT) 343 and an inertia 342 in an adding section 344, further adds the result of addition performed in the adding section 344 with a convergence 341 in an adding section 345, and then outputs the result of addition performed in the adding section 345 as the compensation signal CM.

In such an electric power steering apparatus, cases that use a motor having a multi-system motor winding of a constitution to continue a motor operation even if a failure (including an abnormality) of the motor occurs, are increasing. For examples, with respect to a motor having two-system motor windings, coils of a stator are separated into two systems (a U1 phase to a W1 phase and a U2 phase to a W2 phase), and it is possible to rotate a rotor of the other system even if the failure occurs in one system and to continue an assist control.

With respect to an electric power steering apparatus equipped with such a motor, when operating normally, two systems generally rotate the rotor cooperatively, and current command values for respective motor windings are distributed (a half of the current command value are distributed respectively when characteristics of motor windings of two systems are equivalent). Therefore, when an abnormality occurs in one system, a current command value for a motor winding of the other normal system remains as the distributed value if no change is performed, so that there is the possibility that a steering assist torque decreases. When a compensation signal is added to the current command value, the compensation signal also becomes small when the abnormality occurs, so that the characteristic compensation for improving the convergence, the inertia characteristic and so on is not performed sufficiently, a vibration increases because a stability is deteriorated, and this may causes deterioration of steering feeling.

With respect to such deterioration of steering feeling in the case that the abnormality occurs in motor control by the multi-system, a method to suppress the deterioration has been proposed. For example, in Japanese Unexamined Patent Publication No. 2015-39256 A (Patent Document 1), a motor control apparatus is proposed that can continue to drive and control a motor even if an open failure or a short failure occurs in a motor driving circuit, by comprising a motor current cut-off section interposed between the motor driving circuit and a motor winding, an abnormality detecting section that detects an abnormality of a motor drive current or a motor drive voltage, and so on.

THE LIST OF PRIOR ART DOCUMENTS

Patent Documents

Patent Document 1: Japanese Unexamined Patent Publication No. 2015-39256 A

SUMMARY OF THE INVENTION

Problems to be Solved by the Invention

The apparatus disclosed in Patent Document 1 suppresses the deterioration of the steering feeling by calculating a steering assist current command value by using a normal-time steering assist current command value calculation map at normal time and by using an abnormal-time steering assist current command value calculation map at abnormal time. However, since nothing is disclosed in Patent Document 1 with respect to characteristic compensation of the steering system such as characteristic compensation by addition of the compensation signal, the possibility of deteriorating the steering feeling by a lack of the characteristic compensation remains.

The present invention has been developed in view of the above-described circumstances, and an object of the present invention is to provide an electric power steering apparatus that can suppress the deterioration of the steering feeling by changing a current command value of a normal system when an abnormality occurs in any of the systems in motor control by two systems.

Means for Solving the Problems

The present invention relates to an electric power steering apparatus that assists and controls a steering system by calculating a current command value to a motor having two-system motor windings for each system and driving the motor based on the current command value, the above-described object of the present invention is achieved by that comprising: a current command value adjusting section that calculates the current command value by using a steering assist command value and a compensation current command value; wherein the current command value adjusting section has a normal-time coefficient used at normal time and an abnormal-time coefficient used at abnormal time that are set to each system, a value obtained by multiplying a value obtained by adding the steering assist command value and the compensation current command value by the normal-time coefficient is the current command value when the two systems are normal, and a value obtained by adding the compensation current command value to a value obtained by multiplying the steering assist command value by the abnormal-time coefficient is the current command value to a normal system of the systems when an abnormality occurs in any of the systems.

Further, the above-described object of the present invention is achieved by that comprising: a current command value adjusting section that calculates the current command value by using a steering assist command value and a compensation current command value; wherein the current command value adjusting section has a normal-time coefficient used at normal time and a first abnormal-time coefficient and a second abnormal-time coefficient used at abnormal time that are set to each system, a value obtained by multiplying a value obtained by adding the steering assist command value and the compensation current command value by the normal-time coefficient is the current command value when the two systems are normal, and a value obtained by adding a value obtained by multiplying the steering assist command value by the first abnormal-time coefficient and a value obtained by multiplying the compensation current command value by the second abnormal-time coefficient is the current command value to a normal system of the systems when an abnormality occurs in any of the systems.

The above-described object of the present invention is more effectively achieved by that wherein the electric power steering apparatus further comprises a steering assist command value calculating section that calculates the steering assist command value, a compensation current command value calculating section that calculates the compensation current command value, and an abnormality detecting section that detects the abnormality and outputs a signal that informs a system where the abnormality occurs when the abnormality occurs in any of the systems, and wherein the current command value adjusting section calculates the current command value based on presence of the signal and content of the signal by using the steering assist command value calculated in the steering assist command value calculating section and the compensation current command value calculated in the compensation current command value calculating section; or wherein the normal-time coefficient is more than or equal to 0.3 and less than or equal to 0.7, and the abnormal-time coefficient is more than or equal to 0.3 and less than or equal to 0.7; or wherein the normal-time coefficient is more than or equal to 0.3 and less than or equal to 0.7, the first abnormal-time coefficient is more than or equal to 0.3 and less than or equal to 0.7, and the second abnormal-time coefficient is more than or equal to 0.7 and less than or equal to 1.2.

Effects of the Invention

The electric power steering apparatus according to the present invention enables suppression of deterioration of steering feeling without a lack of characteristic compensation by changing a coefficient by which the steering assist command value is multiplied and using the compensation current command value as it is without multiplying the compensation current command value by a coefficient for the normal system, or by multiplying the steering assist command value and the compensation current command value by coefficients different from ones at normal time individually for the normal system.

MODE FOR CARRYING OUT THE INVENTION

Figure 1:
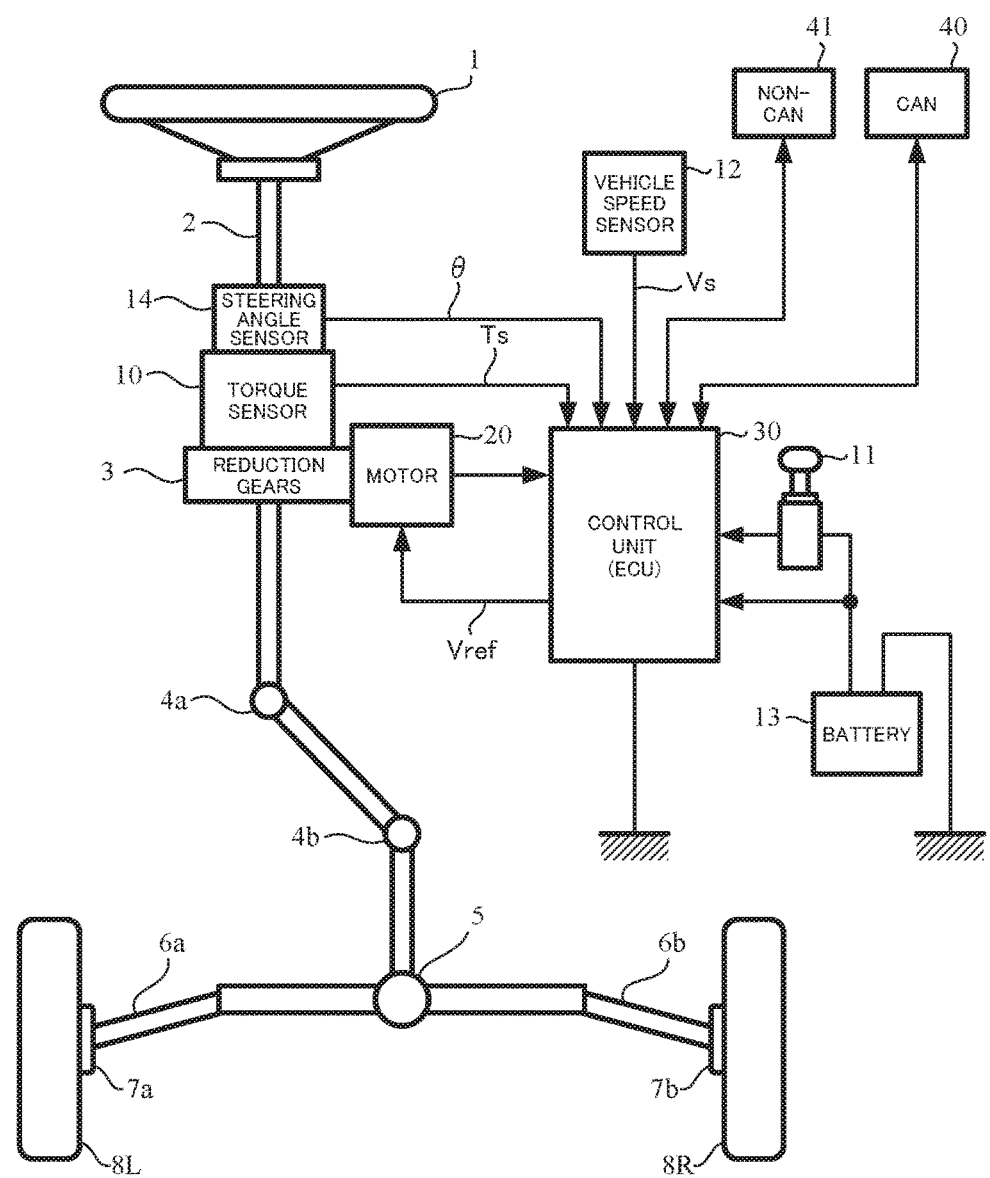
FIG. 1 is a configuration diagram illustrating a general outline of an electric power steering apparatus.

In an electric power steering apparatus that uses a motor having two-system motor windings and where a compensation signal (a compensation current command value) for performing characteristic compensation of a steering system is added to a current command value being a control target value of a current supplied to a motor, the present invention makes magnitude of the compensation current command value unchanged before and after occurrence of an abnormality in the case that the abnormality (including a failure) occurs in the motor windings and/or a motor driving circuit (a motor driving section). When the two systems operate normally, the respective systems drive the motor by sharing the driving, so that the current command values are distributed to the respective systems. Specifically, coefficients (normal-time coefficients) have been set to the respective systems, and values obtained by multiplying an addition value of the compensation current command value and a steering assist command value calculated on the basis of a steering torque or the like by the normal-time coefficients become the current command values of the respective systems. Since only the normal system drives the motor when the abnormality occurs in any of the systems, the calculation method of the current command value is changed. Specifically, coefficients (abnormal-time coefficients) other than the normal-time coefficients have been set to the respective systems, a value obtained by adding the compensation current command value to a multiplication value of the steering assist command value and the abnormal-time coefficient becomes the current command value. If the calculation method of the current command value is not changed in the case that the abnormality occurs, the compensation current command value of the normal system remains as the value obtained by the multiplication of the normal-time coefficient. However, by changing the calculation method, the whole magnitude of the compensation current command value is not changed before and after the occurrence of the abnormality, an equivalent characteristic compensation is continued, so that it is possible to suppress a vibration caused by deterioration of a stability and suppress deterioration of steering feeling.

Further, the present invention can also make the compensation current command value adjustable in the case that the abnormality occurs. Specifically, coefficients other than the normal-time coefficients have been set to the respective systems so as to include a coefficient for the steering assist command value (a first abnormal-time coefficient) and a coefficient for the compensation current command value (a second abnormal-time coefficient). When the abnormality occurs in any of the systems, a value obtained by adding a multiplication value of the steering assist command value and the first abnormal-time coefficient to a multiplication value of the compensation current command value and the second abnormal-time coefficient becomes the current command value. This enables adjustment of the whole variation of the compensation current command value before and after occurrence of the abnormality, so that it is possible to suppress the vibration caused by deterioration of the stability and suppress deterioration of the steering feeling without a lack of the characteristic compensation.

Hereinafter, an embodiment of the present invention will be described with reference to the accompanying drawings.

First, an example of a two-system winding motor to which the present invention is applicable will be described with reference to FIG. 3 and FIG. 4. Although the present invention relates to an electric motor, the following explanations merely describe it as a "motor".

Figure 3:
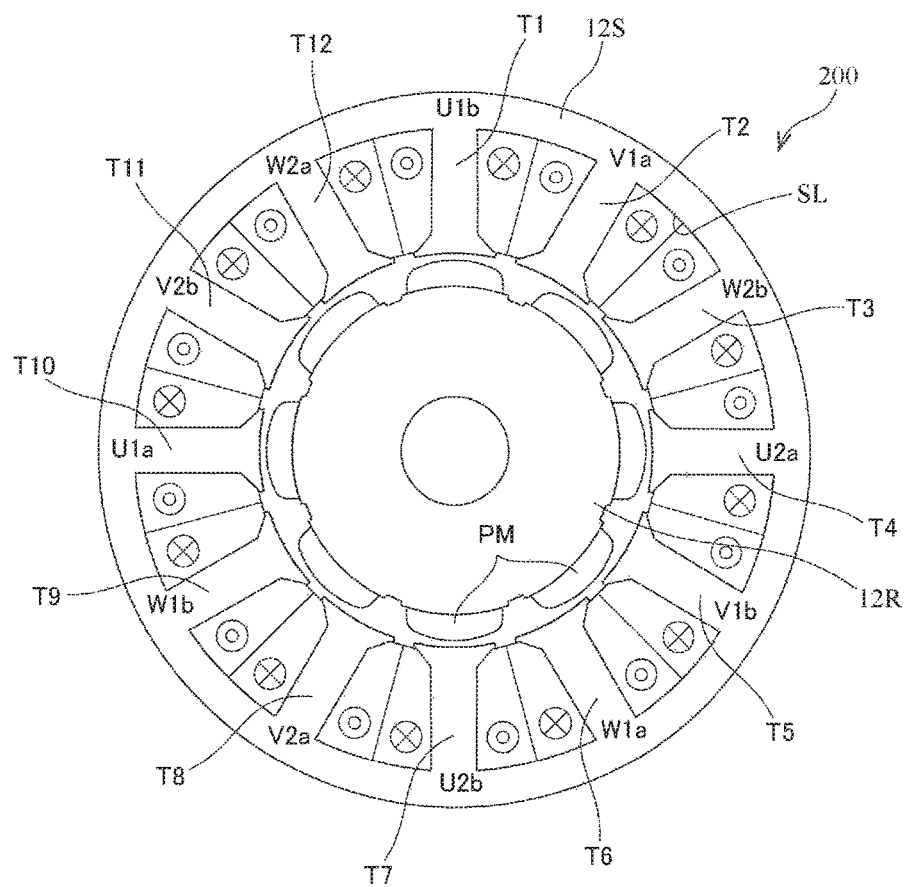
FIG. 3 is a one-side sectional view showing a configuration example of a motor being capable of the present invention.

As shown in FIG. 3, a three-phase motor 200 has a configuration of a surface permanent magnet (SPM) motor that includes a stator 12S having teeth T which are magnetic poles and form slots SL inwardly protruding at an inner periphery, and an eight-pole surface magnet-type rotor 12R which is rotatably disposed opposite to the teeth T at the inner periphery of the stator 12S and wherein permanent magnets PM are mounted on the surface. Here, the number of the teeth T of the stator 12S is set to "phase number×2n" ("n" is an integer which is two or more). For example, in the case of n=2, the motor has a configuration of eight poles and twelve slots. Moreover, the number of the pole is not limited to 8, and the number of the slot is not limited to 12.

Figure 4:
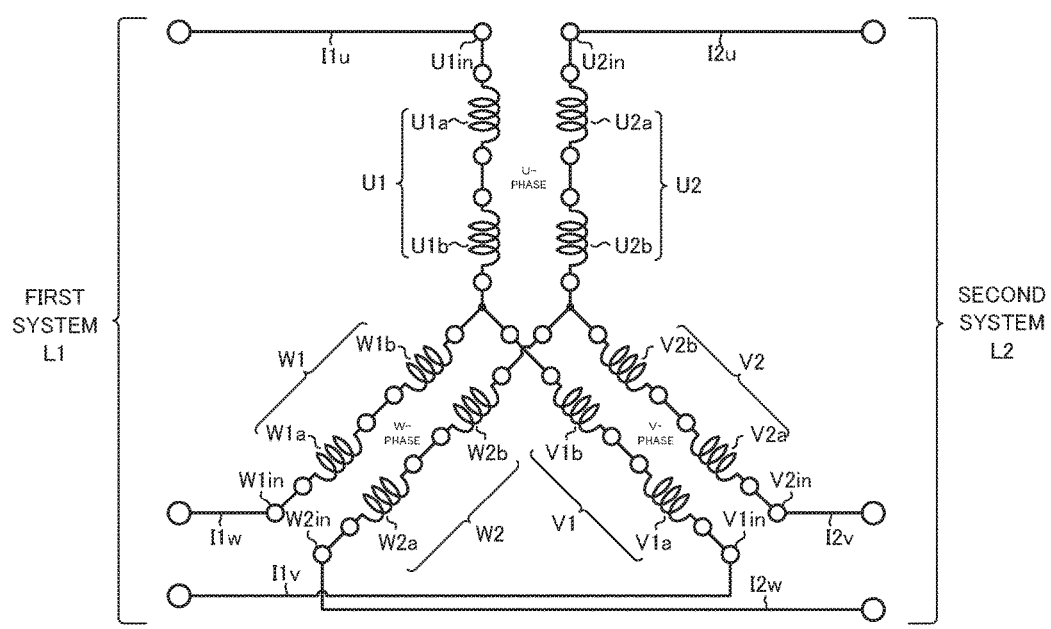
FIG. 4 is a configuration diagram showing a winding structure example of the motor being capable of the present invention.

In the two systems as shown in FIG. 4, a first three-phase motor winding L1 and a second three-phase motor winding L2, which are poly-phase motor windings that each of the same phase magnetic poles is in phase with the rotor magnets, are wound on the slots SL of the stator 12S. In the first three-phase motor winding L1, respective one-ends of a U-phase coil U1, a V-phase coil V1 and a W-phase coil W1 are connected each other so as to form a star-connection. The other ends of the phase coils U1, V1 and W1 are connected to a control section of an electric power steering apparatus, and motor driving currents I1u, I1v and I1w are individually supplied to the respective coils.

In the phase coils U1, V1 and W1, two coil sections U1a and U1b, V1a and V1b, and W1a and W1b are respectively formed. The coil sections U1a, V1a and W1a are wound on the teeth T10, T2 and T6 whose positions form an equilateral triangle by concentrated winding. Further, the coil sections U1b, V1b and W1b are wound on the teeth T1, T5 and T9 which are disposed at the positions where the teeth T10, T2 and T6 are respectively shifted by 90 degrees clockwise by concentrated winding.

Similarly, in the second three-phase motor winding L2, respective one-ends of a U-phase coil U2, a V-phase coil V2 and a W-phase coil W2 are connected each other so as to form the star-connection. The other ends of the phase coils U2, V2 and W2 are connected to the control section of the electric power steering apparatus, and motor driving currents I2u, I2v and I2w are individually supplied to the respective coils.

In the phase coils U2, V2 and W2, two coil sections U2a and U2b, V2a and V2b, and W2a and W2b are respectively formed. The coil sections U2a, V2a and W2a are wound on the teeth T4, T8 and T12 whose positions form the equilateral triangle by concentrated winding. Further, the coil sections U2b, V2b and W2b are wound on the teeth T7, T11 and T3 which are disposed at the positions where the teeth T4, T8 and T12 are respectively shifted by 90 degrees clockwise by concentrated winding.

Then, the coil sections U1a and U1b, V1a and V1b, and W1a and W1b of the phase coils U1, V1 and W1, and the coil sections U2a and U2b, V2a and V2b, and W2a and W2b of the phase coils U2, V2 and W2 are wound on the slots SL which sandwich the respective teeth T so that the current directions are the same direction.

As stated above, the coil sections U1a and U1b, V1a and V1b, and W1a and W1b of the phase coils U1, V1 and W1 which form the first three-phase motor winding L1, and the coil sections U2a and U2b, V2a and V2b, and W2a and W2b of the phase coils U2, V2 and W2 which form the second three-phase motor winding L2 are wound on the twelve teeth T which are different each other.

Figure 5:
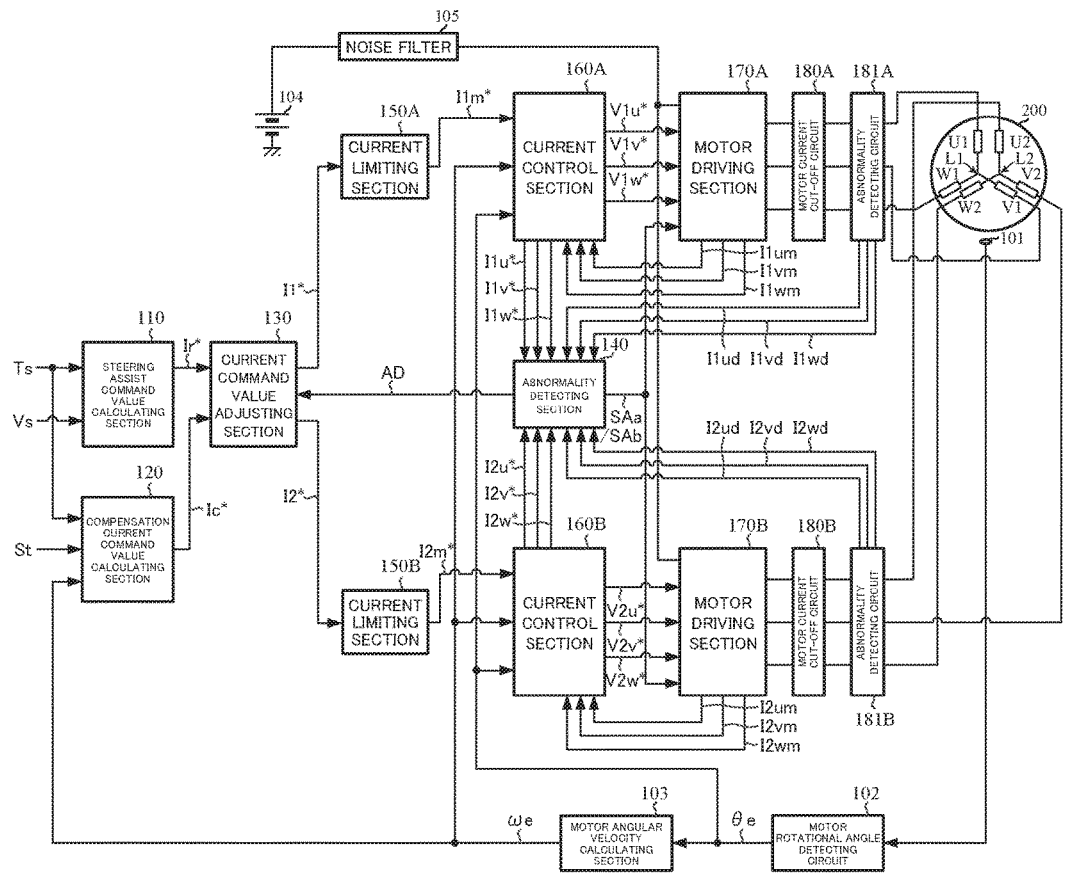
FIG. 5 is a block diagram showing a configuration example (a first embodiment) of the present invention.

For such a three-phase motor having the two-system windings, an example (a first embodiment) of the electric power steering apparatus of the present invention that supplies a current from an individual inverter, decides a switching means where a failure occurs when an OFF-failure (an open failure) or an ON-failure (a short failure) that a switching means of one inverter becomes shut-down occurs, controls a switching means except the faulty switching means, and controls a normal inverter except the faulty inverter including the faulty switching means, will be described with reference to FIG. 5. Hereinafter, a system of the three-phase motor winding L1 is referred to a "first system", and a system of the three-phase motor winding L2 is referred to a "second system".

In order to calculate current command values I1* and I2* for the respective systems, the first embodiment comprises a steering assist command value calculating section 110 that calculates a steering assist command value Ir*, a compensation current command value calculating section 120 that calculates a compensation current command value Ic*, and a current command value adjusting section 130 that calculates the current command values I1* and I2* by means of the steering assist command value Ir* and the compensation current command value Ic*. In order to drive and control a three-phase motor 200 on the basis of the current command values I1* and I2*, the first embodiment comprises current control sections 160A and 160B that calculate voltage command values, motor driving sections 170A and 170B that input the voltage command values, and motor current cut-off circuits 180A and 180B that are interposed between output sides of the motor driving sections 170A and 170B and the first motor winding L1 and the second motor winding L2 of the three-phase motor 200, for the respective systems. Further, the first embodiment comprises abnormality detecting circuits 181A and 181B that are connected to the motor current cut-off circuits 180A and 180B, and an abnormality detecting section 140 that detects the abnormality on the basis of outputs from the abnormality detecting circuits 181A and 181B and outputs from the current control sections 160A and 160B.

The three-phase motor 200 comprises a rotational position sensor 101 such as a Hall element or the like that detects a rotational position of the rotor, a value detected by the rotational position sensor 101 is inputted into a motor rotational angle detecting circuit 102, a motor rotational angle (that is an electric angle) θe is detected in the motor rotational angle detecting circuit 102, the motor rotational angle θe is inputted into a motor angular velocity calculating section 103, and a motor angular velocity ωe is calculated in the motor angular velocity calculating section 103. Further, a direct current is supplied to the motor driving sections 170A and 170B through a noise filter 105 from a battery 104 serving as a direct-current power source.

Figure 6:
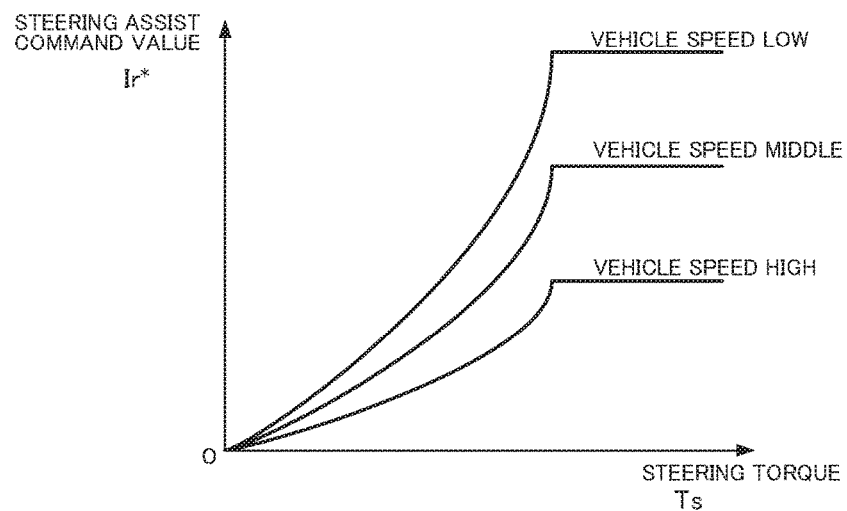
FIG. 6 is a characteristic diagram showing an example of an assist map used in a steering assist command value calculating section.

The steering assist command value calculating section 110 calculates the steering assist command value Ir* on the basis of a steering torque Ts and a vehicle speed Vs by using an assist map. The assist map used in the steering assist command value calculating section 110 has a characteristic equivalent to an assist map used in a current command value calculating section 31 shown in FIG. 2. For example, as shown in FIG. 6, it is a characteristic that the steering assist command value Ir* increases as the steering torque Ts increases, and the steering assist command value Ir* becomes constant when the steering torque Ts becomes more than or equal to a predetermined value. Further, the higher the vehicle speed Vs becomes, the smaller the steering assist command value Ir* becomes. Moreover, when a phase shift occurs in the steering assist command value (the steering assist command value signal) Ir*, it is possible to perform processing for phase compensation.

The compensation current command value calculating section 120 calculates the compensation current command value Ic* on the basis of the steering torque Ts, the motor angular velocity ωe calculated in the motor angular velocity calculating section 103, and a self-aligning torque (SAT) St detected by a SAT sensor (not shown). As with a compensation signal generating section 34 shown in FIG. 2, the compensation current command value calculating section 120 calculates the compensation current command value Ic* in order to perform a characteristic compensation of a steering system, and a convergence and an inertia characteristic are improved by using the compensation current command value Ic*.

Figure 7:
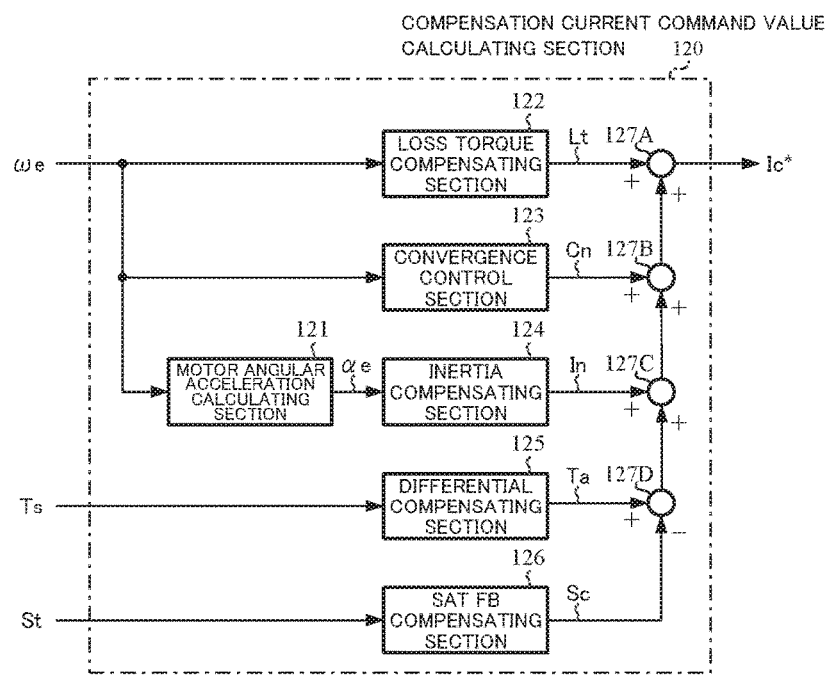
FIG. 7 is a block diagram showing a configuration example of a compensation current command value calculating section.

A configuration example of the compensation current command value calculating section 120 is shown in FIG. 7. The compensation current command value calculating section 120 comprises a motor angular acceleration calculating section 121, a loss torque compensating section 122, a convergence control section 123, an inertia compensating section 124, a differential compensating section 125, a SAT feedback compensating section 126, adding sections 127A, 127B and 127C, and a subtracting section 127D. The motor angular acceleration calculating section 121 calculates a motor angular acceleration $\alpha e$ by means of the motor angular velocity $\omega e$. The loss torque compensating section 122 outputs a loss torque compensation signal Lt on the basis of the motor angular velocity $\omega e$ in order to perform assistance equivalent to a loss torque in a direction where a loss torque of the three-phase motor 200 occurs, that is, in a rotation direction of the three-phase motor 200. The convergence control section 123 outputs a convergence signal Cn for braking a motion that a steering wheel is swayed on the basis of the motor angular velocity $\omega e$ in order to improve a convergence of a yaw of a vehicle. The inertia compensating section 124 performs assistance equivalent to a force occurring in accordance with an inertia of the three-phase motor 200, and outputs an inertia signal In on the basis of the motor angular acceleration $\alpha e$ in order to prevent inertia feeling or responsiveness of control from getting worse. The differential compensating section 125 improves a characteristic of a feedforward system for enhancing a response speed with respect to the steering torque Ts, and outputs a steering torque Ta whose characteristic is improved. In the case of feeding back the SAT St as it is in order to perform characteristic compensation of the steering system, steering becomes too heavy, and it is not possible to improve steering feeling, so that the SAT feedback compensating section 126 feeds back only necessary and sufficient information to improve the steering feeling by performing signal processing with respect to the SAT St using a feedback filter having a vehicle speed-sensitive gain and a frequency characteristic, and outputting the result as a SAT feedback signal Sc. Moreover, it is possible not to use a value detected by the SAT sensor as the SAT St, but to use, for example, a value estimated by a method performed in a SAT estimating section described in a publication of Japanese Patent No. 5251898 B.

The current command value adjusting section 130 calculates the current command value I1* for the first system and the current command value I2* for the second system by means of the steering assist command value Ir* and the compensation current command value Ic* by using preset normal-time coefficients C1 and C2 and abnormal-time coefficients C1' and C2'. When the two systems operate normally, the current command values I1* and I2* are calculated in accordance with the following expression 1 and expression 2.

$$I1^* = (Ir^* + Ic^*) \times C1 \qquad \text{[Expression 1]}$$

$$I2^* = (Ir^* + Ic^*) \times C2 \qquad \text{[Expression 2]}$$

The current command value I2* is calculated in accordance with the following expression 3 when the abnormality occurs in the first system, and the current command value I1* is calculated in accordance with the following expression 4 when the abnormality occurs in the second system.

$$I2^* = Ir^* \times C2' + Ic^* \qquad \text{[Expression 3]}$$

$$I1^* = Ir^* \times C1' + Ic^* \qquad \text{[Expression 4]}$$

The normal-time coefficients C1 and C2 are between 0.3 and 0.7, are set so as to establish C1+C2=1, and values of them are determined on the basis of a distribution by dispersion of heat, a distribution of a load to the motor for the respective systems, etc. The abnormal-time coefficients C1' and C2' are also set between 0.3 and 0.7. All coefficients may be 0.5 when motor characteristics of the first system and the second system are equivalent. It is detected by means of an abnormality detection signal AD outputted from the abnormality detecting section 140 that the abnormality occurs in the first system and/or the second system.

Figure 2:
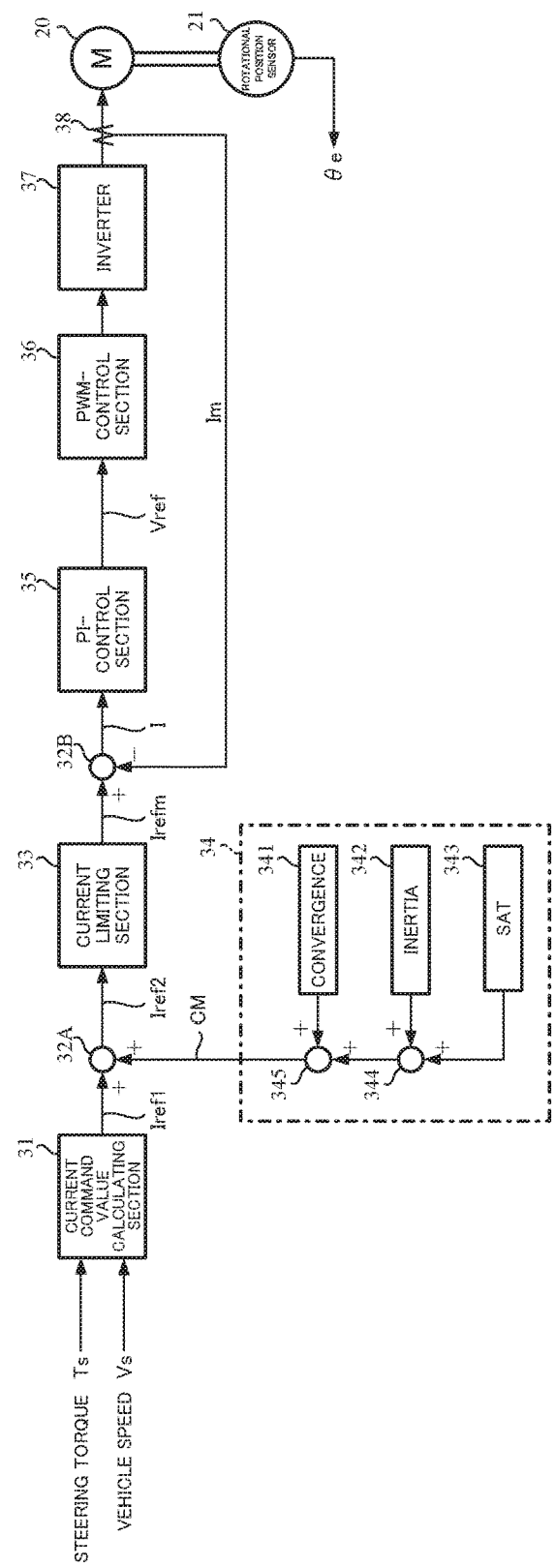
FIG. 2 is a block diagram showing a configuration example of a control system of the electric power steering apparatus.

As with a current limiting section 33 shown in FIG. 2, current limiting sections 150A and 150B limit maximum currents of the current command values I1* and I2* respectively, and output current command values I1m* and I2m*.

The current control section 160A calculates a three-phase voltage command value (consisting of a U-phase voltage command value V1u*, a V-phase voltage command value V1v*, and a W-phase voltage command value V1w*) for the motor driving section 170A on the basis of the current command value I1m*, a three-phase motor current (consisting of a U-phase motor current I1um, a V-phase motor current I1vm, and a W-phase motor current I1wm) fed back from the motor driving section 170A, the motor rotational angle $\theta e$, and the motor angular velocity $\omega e$.

Figure 8:
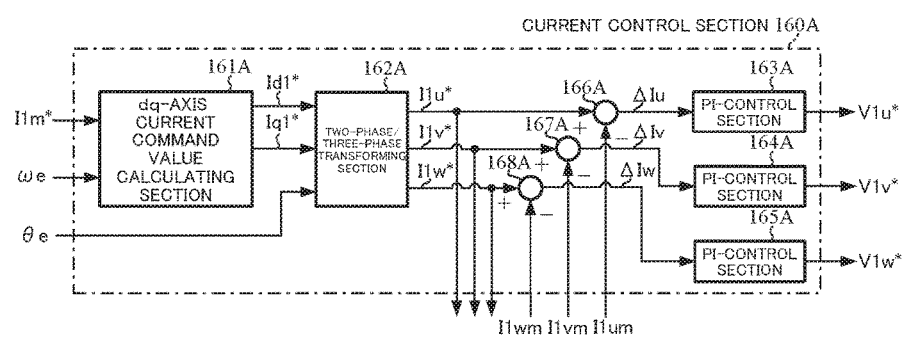
FIG. 8 is a block diagram showing a configuration example of a current control section.

A configuration example of the current control section 160A is shown in FIG. 8. The current control section 160A comprises a dq-axis current command value calculating section 161A, a two-phase/three-phase transforming section 162A, PI-control sections 163A, 164A and 165A, and subtracting sections 166A, 167A and 168A. The dq-axis current command value calculating section 161A calculates a d-axis current command value Id1* and a q-axis current command value Iq1* that are current commands in a dq-rotary coordinate system on the basis of the current command value I1m* and the motor angular velocity $\omega e$. For example, the dq-axis current command value calculating section 161A calculates the d-axis current command value Id1* and the q-axis current command value Iq1* by a method performed in a d-q axis current command value calculating section described in a publication of Japanese Patent No. 5282376 B. In the calculation, when a motor angular velocity corresponding to a mechanical angle of the motor is needed, it is calculated on the basis of the motor angular velocity $\omega e$ corresponding to an electric angle. The two-phase/three-phase transforming section 162A transforms a two-phase current command value consisting of the d-axis current command value Id1* and the q-axis current command value Iq1* into a three-phase current command value (consisting of a U-phase current command value I1u*, a V-phase current command value I1v*, and a W-phase current command value I1w*) in a UVW-fixed coordinate system by using the motor rotational angle $\theta e$ on the basis of a spatial vector modulation (a spatial vector transformation). The three-phase current command value is outputted to the abnormality detecting section 140, at the same time, deviations $\Delta Iu$, $\Delta Iv$ and $\Delta Iw$ between the three-phase current command value and the three-phase motor current are obtained in the subtracting section 166A, 167A and 168A respectively, and the respective deviations are inputted into the PI-control sections 163A, 164A and 165A respectively. As with a PI-control section 35 shown in FIG. 2, the PI-control sections 163A, 164A and 165A obtain the three-phase voltage command value (consisting of the U-phase voltage command value V1u*, the V-phase voltage command value V1v*, and the W-phase voltage command value V1w*) on the basis of the deviations $\Delta Iu$, $\Delta Iv$ and $\Delta Iw$ respectively.

The current control section 160B calculates a three-phase voltage command value (consisting of a U-phase voltage command value V2$u$*, a V-phase voltage command value V2$v$*, and a W-phase voltage command value V2$w$*) for the motor driving section 170B on the basis of the current command value I2$m$*, a three-phase motor current (consisting of a U-phase motor current I2$um$, a V-phase motor current I2$vm$, and a W-phase motor current I2$uw$) fed back from the motor driving section 170B, the motor rotational angle θe, and the motor angular velocity ωe, by the same configuration and operations as the current control section 160A. A three-phase current command value (consisting of a U-phase current command value I2$u$*, a V-phase current command value I2$v$*, and a W-phase current command value I2$w$*) calculated in the current control section 160B is also outputted to the abnormality detecting section 140.

Figure 9A:
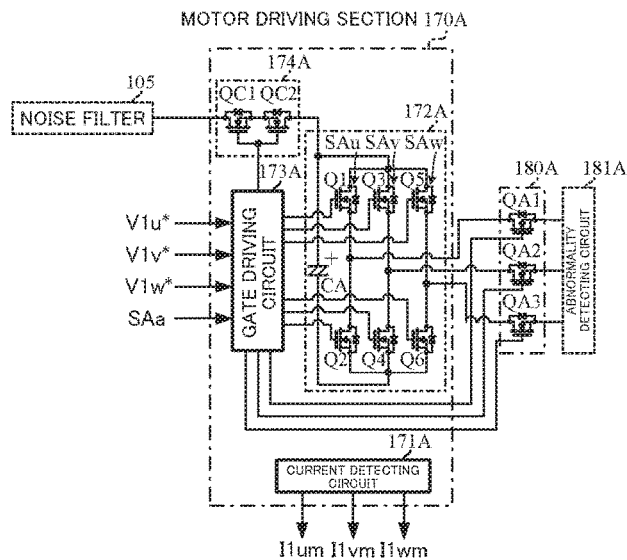
FIG. 9 is a block diagram showing a configuration example of a motor driving section and a motor current cut-off circuit.
Figure 9B:
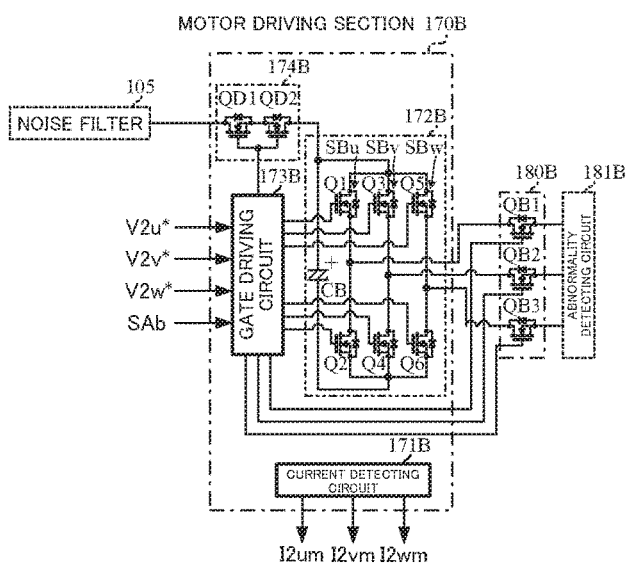
Figure 10:
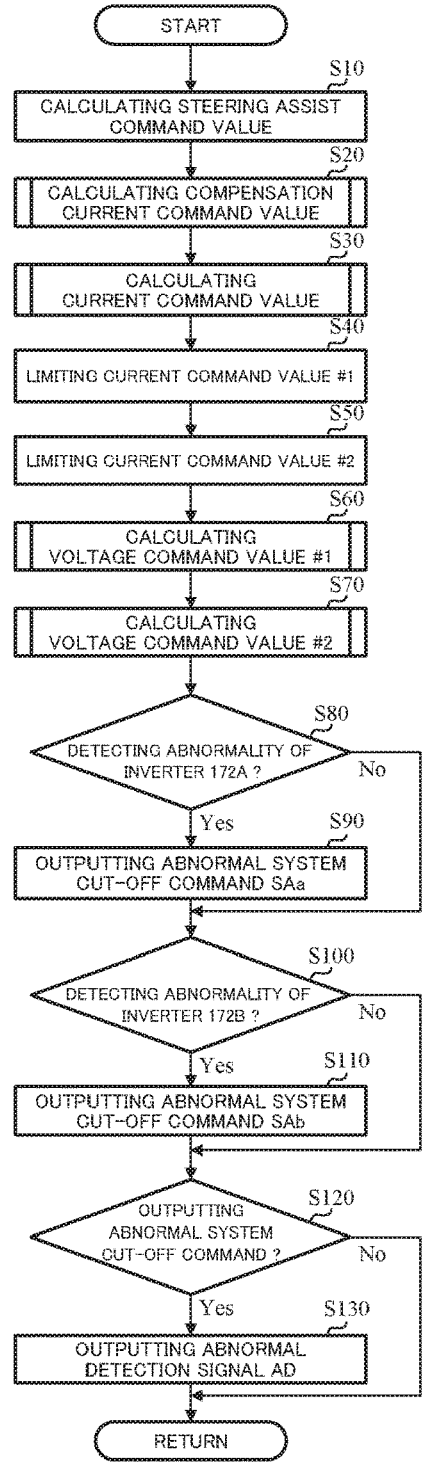
FIG. 10 is apart of a flowchart showing an operating example (the first embodiment) of the present invention.
Figure 11:
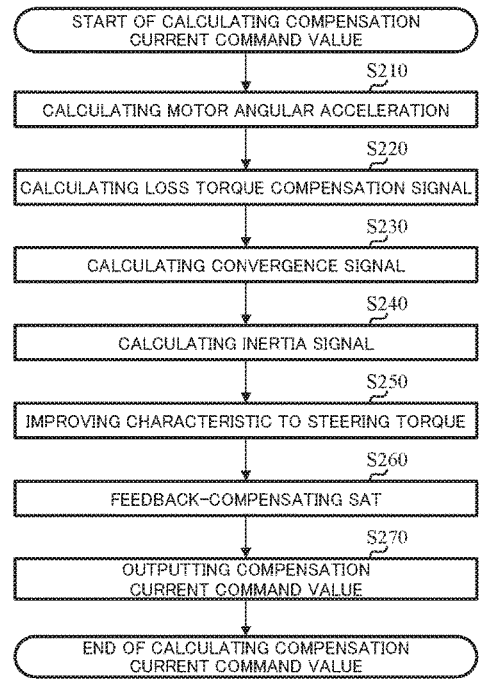
FIG. 11 is a flowchart showing an operating example of calculation of a compensation current command value in the first embodiment.

In addition to the U-phase current command value I1$u$*, the V-phase current command value I1$v$*, the W-phase current command value I1$w$*, the U-phase current command value I2$u$*, the V-phase current command value I2$v$* and the W-phase current command value I2$w$*, detected motor current values I1$ud$, I1$vd$, I1$wd$, I2$ud$, I2$vd$, and I2$wd$ that are detected by the abnormality detecting circuits 181A and 181B provided between the motor current cut-off circuits 180A and 180B and the first motor winding L1 and the second motor winding L2 of the three-phase motor 200, are inputted into the abnormality detecting section 140. Here, a configuration example of the motor driving section 170A and the motor current cut-off circuit 180A is shown in FIG. 9A, and a configuration example of the motor driving section 170B and the motor current cut-off circuit 180B is shown in FIG. 9B. The motor driving circuits 170A and 170B respectively comprise gate driving circuits 173A and 173B that generate gate signals by inputting the three-phase voltage command value (V1$u$*, V1$v$* and V1$w$*) outputted from the current control section 160A and the three-phase voltage command value (V2$u$*, V2$v$* and V2$w$*) outputted from the current control section 160B and that serve as the current control sections at abnormal time, inverters 172A and 172B that input the gate signals outputted from the gate driving circuits 173A and 173B, and current detecting circuits 171A and 171B. The abnormality detecting section 140 detects an open failure (an OFF-failure) and a short failure (an ON-failure) of field effect transistors (FETs) Q1 to Q6 serving as switching elements that constitute the inverters 172A and 172B by comparing the inputted detected motor current values I1$ud$ to I1$wd$ and I2$ud$ to I2$wd$ with the three-phase current command values (I1$u$* to I1$w$*, and I2$u$* to I2$w$*) respectively. When detecting the abnormality caused by the open failure or the short failure of the FETs constituting the inverters 172A and 172B, the abnormality detecting section 140 outputs an abnormal system cut-off command SAa or SAb to the gate driving circuit 173A or 173B of the motor driving section 170A or 170B where the abnormality is detected, and outputs an abnormal detection signal AD to the current command value adjusting section 130. In order that the system where the abnormality is detected is identified by the abnormal detection signal AD, for example, the abnormality detecting section 140 sets "1" on the abnormal detection signal AD when the first system is abnormal, sets "2" on the abnormal detection signal AD when the second system is abnormal, and sets "3" on the abnormal detection signal AD when the both systems are abnormal.

When the three-phase voltage command values are inputted from the current control sections 160A and 160B, each of the gate driving circuits 173A and 173B in the motor driving section 170A and 170B generates six PWM-signals (gate signals) on the basis of these voltage command values and a carrier signal of a triangular wave, and outputs these PWM-signals to the inverters 172A and 172B.

Further, at the normal time when the abnormal system cut-off command SAa is not inputted into the gate driving circuit 173A from the abnormality detecting section 140, the gate driving circuit 173A outputs three gate signals of high level to the motor current cut-off circuit 180A, and outputs two gate signals of high level to a power source cut-off circuit 174A. At the abnormal time when the abnormal system cut-off command SAa has been inputted into the gate driving circuit 173A from the abnormality detecting section 140, the gate driving circuit 173A simultaneously outputs three gate signals of low level to the motor current cut-off circuit 180A, cuts off the motor currents, simultaneously outputs two gate signals of low level to the power source cut-off circuit 174A, and cuts off a battery power.

Similarly, at the normal time when the abnormal system cut-off command SAb is not inputted into the gate driving circuit 173B from the abnormality detecting section 140, the gate driving circuit 173B outputs three gate signals of high level to the motor current cut-off circuit 180B, and outputs two gate signals of high level to a power source cut-off circuit 174B. At the abnormal time when the abnormal system cut-off command SAb has been inputted into the gate driving circuit 173B from the abnormality detecting section 140, the gate driving circuit 173B simultaneously outputs three gate signals of low level to the motor current cut-off circuit 180B, cuts off the motor currents, simultaneously outputs two gate signals of low level to the power source cut-off circuit 174B, and cuts off the battery power.

A battery current of the battery 104 is inputted into the inverters 172A and 172B respectively through the noise filter 105 and the power source cut-off circuits 174A and 174B, and electrolytic capacitors CA and CB for smoothing are respectively connected to input sides of the inverters 172A and 172B.

The inverters 172A and 172B respectively have six FETs Q1 to Q6 serving as switching elements, and have a configuration created by connecting in parallel three switching-arms (SAu, SAv and SAw in the inverter 172A; SBu, SBv and SBw in the inverter 172B) that are configured by connecting in series two FETs. U-phase currents I1$u$ and I2$u$, V-phase currents I1$v$ and I2$v$, and W-phase currents I1$w$ and I2$w$, which are the motor driving currents, are inputted from a connection between the FETs of each switching-arm into the first motor winding L1 and the second motor winding L2 of the three-phase motor 200 through the motor current cut-off circuits 180A and 180B by inputting the PWM-signals outputted from the gate driving circuits 173A and 173B into the gates of the FETs Q1 to Q6.

A both-end voltage of a shunt resistor, which is not shown in FIG. 9, interposed between each switching-arm of the inverters 172A and 172B and the ground is inputted into the current detecting circuits 171A and 171B in the motor driving sections 170A and 170B, and the three-phase motor currents (I1$um$, I1$vm$ and I1$wm$, and I2$um$, I2$vm$ and I2$wm$) are detected.

The motor current cut-off circuit 180A has three FETs QA1, QA2 and QA3 for current cut-off, and the motor current cut-off circuit 180B has three FETs QB1, QB2 and QB3 for current cut-off. The FETs QA1 to QA3 and the FETs QB1 to QB3 of the motor current cut-off circuits 180A and 180B are connected to respective parasitic diodes whose cathodes are disposed at the inverters 172A and 172B sides in the same direction.

The power source cut-off circuits 174A and 174B respectively have a series circuit configuration that two FETs QC1 and QC2 and two FETs QD1 and QD2 are disposed so that drains are connected each other and parasitic diodes are provided in an opposite direction. Sources of the FETs QC1 and QD1 are connected each other, and are connected to an output side of the noise filter 105. Sources of the FETs QC2 and QD2 are respectively connected to sources of the FETs Q1, Q2 and Q3 of the inverters 172A and 172B.

In such a configuration, an operating example will be described.

As the operation starts, the motor rotational angle detecting circuit 102 detects the motor rotational angle θe of the three-phase motor 200, and outputs it to the motor angular velocity calculating section 103, and the current control sections 160A and 160B.

The motor angular velocity calculating section 103 calculates the motor angular velocity ωe by means of the motor rotational angle θe, and outputs it to the compensation current command value calculating section 120, and the current control sections 160A and 160B.

An operating example from the steering assist command value calculating section 110 to the abnormality detecting section 140 will be described with reference to flowcharts in FIG. 10 to FIG. 13.

The steering assist command value calculating section 110 inputs the steering torque Ts detected by the torque sensor 10 and the vehicle speed Vs detected by the vehicle speed sensor 12, and calculates the steering assist command value Ir* by using the assist map having a characteristic as shown in FIG. 6 (Step S10).

The compensation current command value calculating section 120 inputs the motor angular velocity ωe, the steering torque Ts and the SAT St, and calculates the compensation current command value Ic* (Step S20). Moreover, the operations of the steering assist command value calculating section 110 and the compensation current command value calculating section 120 may interchange in order, or may be performed in parallel.

In calculating the compensation current command value Ic*, the motor angular velocity ωe is inputted into the loss torque compensating section 122, the convergence control section 123 and the motor angular acceleration calculating section 121, the steering torque Ts is inputted into the differential compensating section 125, and the SAT St is inputted into the SAT feedback compensating section 126. The motor angular acceleration calculating section 121 calculates the motor angular acceleration αe by means of the motor angular velocity ωe (Step S210), and outputs it to the inertia compensating section 124. The loss torque compensating section 122 obtains the loss torque compensation signal Lt on the basis of the motor angular velocity ωe (Step S220). The convergence control section 123 obtains the convergence signal Cn on the basis of the motor angular velocity ωe (Step S230). The inertia compensating section 124 obtains the inertia signal In on the basis of the motor angular acceleration αe (Step S240). The differential compensating section 125 improves the characteristic of the feedforward system with respect to the steering torque Ts (Step S250), and outputs the result as the steering torque Ta. The SAT feedback compensating section 126 performs the signal processing with respect to the SAT St using the feedback filter (Step S260), and outputs the SAT feedback signal Sc. Further, the compensation current command value calculating section 120 subtracts the SAT feedback signal Sc from the steering torque Ta in the subtracting section 127D, adds the inertia signal In to the subtraction result in the adding section 127C, adds the convergence signal Cn to the addition result in the adding section 127B, moreover, adds the loss torque compensation signal Lt to the addition result in the adding section 127A, and outputs the result as the compensation current command value Ic* (Step S270). Moreover, the operations of the loss torque compensating section 122, the convergence control section 123, the inertia compensating section 124, the differential compensating section 125, and the SAT feedback compensating section 126 may interchange in order, or may be performed in parallel.

The steering assist command value Ir* and the compensation current command value Ic* are inputted into the current command value adjusting section 130, and the current command value adjusting section 130 calculates the current command values I1* and I2* by means of them (Step S30).

When the current command value adjusting section 130 is not inputted the abnormal detection signal AD from the abnormality detecting section 140 (Step S310), the current command value adjusting section 130 calculates the current command values I1* and I2* on the basis of the expression 1 and the expression 2 by using the preset normal-time coefficients C1 and C2, the steering assist command value Ir* and the compensation current command value Ic* (Step S320), outputs the current command value I1* to the current limiting section 150A, and outputs the current command value I2* to the current limiting section 150B. When the current command value adjusting section 130 has inputted the abnormal detection signal AD (Step S310), the current command value adjusting section 130 checks the value of the abnormal detection signal AD (Step S330). When the value of the abnormal detection signal AD is "1", the current command value adjusting section 130 judges that the abnormality has occurred in the first system, calculates only the current command value I2* on the basis of the expression 3 by using the preset abnormal-time coefficient C2', the steering assist command value Ir* and the compensation current command value Ic* (Step S340), and outputs it to the current limiting section 150B. When the value of the abnormal detection signal AD is "2", the current command value adjusting section 130 judges that the abnormality has occurred in the second system, calculates only the current command value I1* on the basis of the expression 4 by using the preset abnormal-time coefficient C1', the steering assist command value Ir* and the compensation current command value Ic* (Step S350), and outputs it to the current limiting section 150A. When the value of the abnormal detection signal AD is "3", the current command value adjusting section 130 judges that the abnormality has occurred in both the first system and the second system, gives warning (Step S360), and takes measures as needed.

The current limiting sections 150A inputs the current command value I1*, outputs a predetermined value as the current command value I1m* when the current command value I1* exceeds the predetermined value, and outputs the current command value I1* as the current command value I1m* when the current command value I1* does not exceed the predetermined value (Step S40). Similarly, the current limiting section 150B inputs the current command value I2*, and obtains and outputs the current command value I2m* (Step S50).

The current control section 160A calculates the three-phase voltage command value on the basis of the current command value I1m*, the three-phase motor current, the motor rotational angle θe and the motor angular velocity ωe (Step S60).

The current command value I1m* and the motor angular velocity ωe are inputted into the dq-axis current command value calculating section 161A, the motor rotational angle θe is inputted into the two-phase/three-phase transforming section 162A, and the three-phase motor current (I1um, I1vm and I1wm) is subtraction-inputted into the subtracting sections 166A, 167A and 168A respectively. The dq-axis current command value calculating section 161A calculates the d-axis current command value Id1* and the q-axis current command value Iq1* on the basis of the current command value I1m* and the motor angular velocity ωe (Step S610), and outputs them to the two-phase/three-phase transforming section 162A. The two-phase/three-phase transforming section 162A transforms the d-axis current command value Id1* and the q-axis current command value Iq1* into the U-phase current command value I1u*, the V-phase current command value I1v* and the W-phase current command value I1w* by using the motor rotational angle θe (Step S620). The U-phase current command value I1u*, the V-phase current command value I1v* and the W-phase current command value I1w* are outputted to the abnormality detecting section 140, and at the same time, are addition-inputted into the subtracting sections 166A, 167A and 168A respectively. The deviation ΔIu between the U-phase current command value I1u* and the motor current I1um is calculated in the adding section 166A, the deviation ΔIv between the V-phase current command value I1v* and the motor current I1vm is calculated in the adding section 167A, and the deviation ΔIw between the W-phase current command value I1w* and the motor current I1wm is calculated in the adding section 168A (Step S630). The PI-control section 163A inputs the deviation ΔIu, and calculates the U-phase voltage command value V1u* by PI-control calculation. The PI-control section 164A inputs the deviation ΔIv, and calculates the V-phase voltage command value V1v* by PI-control calculation. The PI-control section 165A inputs the deviation ΔIw, and calculates the W-phase voltage command value V1w* by PI-control calculation (Step S640). The three-phase voltage command value (V1u*, V1v* and V1w*) is outputted to the motor driving section 170A.

According to the same operation as the current control section 160A, the current control section 160B also calculates the three-phase current command value (I2u*, I2v* and I2w*) and the three-phase voltage command value (V2u*, V2v* and V2w*) on the basis of the current command value I2m*, the three-phase motor current (I2um, I2vm and I2wm), the motor rotational angle θe, and the motor angular velocity ωe (Step S70), the three-phase current command value (I2u*, I2v* and I2w*) is outputted to the abnormality detecting section 140, and the three-phase voltage command value (V2u*, V2v* and V2w*) is outputted to the motor driving section 170B.

The abnormality detecting section 140 inputting the three-phase current command values (I1u*, I1v* and I1w*, and I2u*, I2v* and I2w*) also inputs the detected motor current values I1ud, I1vd and I1wd that are detected by the abnormality detecting circuit 181A, and the detected motor current values I2ud, I2vd and I2wd that are detected by the abnormality detecting circuit 181B, and detects the open failure or the short failure of the FETs constituting the inverters 172A and 172B. When the abnormality detecting section 140 detects the abnormality by comparing the detected motor current values I1ud, I1vd and I1wd with the three-phase current command value (I1u*, I1v* and I1w*) (Step S80), the abnormality detecting section 140 outputs the abnormal system cut-off command SAa to the motor driving circuit 170A (Step S90). When the abnormality detecting section 140 detects the abnormality by comparing the detected motor current values I2ud, I2vd and I2wd with the three-phase current command value (I2u*, I2v* and I2w*) (Step S100), the abnormality detecting section 140 outputs the abnormal system cut-off command SAb to the motor driving circuit 170B (Step S110). Further, when the abnormality detecting section 140 has outputted the abnormal system cut-off command(s) SAa and/or SAb (Step S120), that is, has detected the abnormality in both or either of the inverters 172A and 172B, the abnormality detecting section 140 outputs the abnormal detection signal AD to the current command value adjusting section 130 (Step S130). At this time, the abnormality detecting section 140 sets "1" on the abnormal detection signal AD when detecting the abnormality in only the inverter 172A, sets "2" on the abnormal detection signal AD when detecting the abnormality in only the inverter 172B, and sets "3" on the abnormal detection signal AD when detecting the abnormality in both of the inverters 172A and 172B. This abnormal detection signal AD is used in judging the conditions at the steps S310 and S330.

In the motor driving section 170A, the three-phase voltage command value (V1u*, V1v* and V1w*) is inputted into the gate driving circuit 173A, and the abnormal system cut-off command SAa is also inputted into the gate driving circuit 173A when the abnormality detecting section 140 has outputted the abnormal system cut-off command SAa. When the three-phase voltage command value is inputted, the gate driving circuit 173A generates the six PWM-signals on the basis of the three-phase voltage command value and the carrier signal of the triangular wave, and outputs the PWM-signals to the inverter 172A. Further, when the abnormal system cut-off command SAa is not inputted, the gate driving circuit 173A outputs the gate signals of high level to the motor current cut-off circuit 180A and the power source cut-off circuit 174A. Herewith, the FETs QA1, QA2 and QA3 of the motor current cut-off circuit 180A become an on-state, conduction becomes possible between the inverter 172A and the first motor winding L1 of the three-phase motor 200, moreover, the FETs QC1 and QC2 of the power source cut-off circuit 174A become an on-state, and a direct current from the battery 104 is supplied to the inverter 172A through the noise filter 105. Therefore, the PWM-signals outputted from the gate driving circuit 173A are inputted into the gates of the FETs Q1 to Q6 of the inverter 172A, and the U-phase current I1u, the V-phase current I1v and the W-phase current I1w are inputted from the connection between the FETs of each of the switching-arms SAu, SAv and SAw into the first motor winding L1 of the three-phase motor 200. When the abnormal system cut-off command SAa has been inputted, the gate driving circuit 173A outputs the gate signals of low level to the motor current cut-off circuit 180A and the power source cut-off circuit 174A. Herewith, the FETs QA1, QA2 and QA3 of the motor current cut-off circuit 180A become an off-state, the conduction to the first motor winding L1 of the three-phase motor 200 is cut off, moreover, the FETs QC1 and QC2 of the power source cut-off circuit 174A become an off-state, and supply of the direct current from the battery 104 to the inverter 172A is cut off.

According to the same operation as the motor driving circuit 170A, the current of each phase inputted into the second motor winding L2 of the three-phase motor 200 is controlled in the motor driving circuit 170B.

Moreover, the operations of the first system and the second system may interchange in order, or may be performed in parallel. Though the two-phase/three-phase transforming section 162A calculates the three-phase current command value individually, it is possible to calculate the current command value of one phase on the basis of a total value of the current command values of the other two phases. This enables reduction of an operation amount. Though the current control section comprises plural (three) PI-control sections, it is possible to integrate them because only input and output data of them are different and their operations are basically the same.

Figure 14:
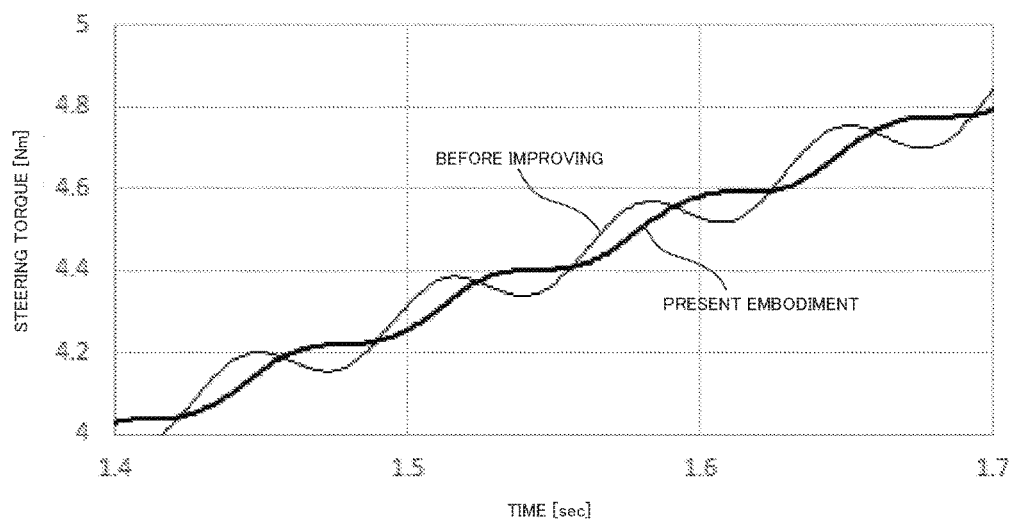
FIG. 14 is a characteristic diagram showing a simulation result of the present invention.

An effect of the prevent embodiment is shown in FIG. 14. FIG. 14, where the vertical axis shows a steering torque [Nm (Newton meter)] and the horizontal axis shows a time [sec], is a diagram showing a steering simulation result in the case of inputting a torque of a sine wave whose frequency is 0.05 Hz and whose amplitude is 10 Nm as a torque inputted to a steering wheel. Both the normal-time coefficients C1 and C2 are 0.5, and both the abnormal-time coefficients C1' and C2' are also 0.5. From FIG. 14, it is possible to confirm that a vibration is more suppressed in the case of the present embodiment than the case of not changing a calculation method of the current command value when the abnormality occurs (corresponding to before improving).

Another configuration example (a second embodiment) of the electric power steering apparatus of the present invention will be described.

In the second embodiment, a method to calculate a current command value in a current command value adjusting section when the abnormality occurs is different from the first embodiment. Since others are the same as the first embodiment, explanations of them will be omitted.

The current command value adjusting section of the second embodiment calculates the current command value I1* for the first system and the current command value I2* for the second system by means of the steering assist command value Ir* and the compensation current command value Ic* by using preset normal-time coefficients C1 and C2, first abnormal-time coefficients C1' and C2', and second abnormal-time coefficients C1" and C2". When the two systems operate normally, as in the case of the first embodiment, the current command values I1* and I2* are calculated in accordance with the expression 1 and the expression 2. However, the current command values I2* is calculated in accordance with the following expression 5 when the abnormality occurs in the first system, and the current command values I1* is calculated in accordance with the following expression 6 when the abnormality occurs in the second system.

$$I2^* = Ir^* \times C2' + Ic^* \times C2''$$ [Expression 5]

$$I1^* = Ir^* \times C1' + Ic^* \times C1''$$ [Expression 6]

The first abnormal-time coefficients C1' and C2' are set between 0.3 and 0.7, as in the case of the first embodiment. The second abnormal-time coefficients C1" and C2" are set in some range in order to optimize feeling accompanying a decrease (0.3 to 0.7) in an assist torque (an assist current) at abnormal time, and are set between 0.7 and 1.2.

Figure 12:
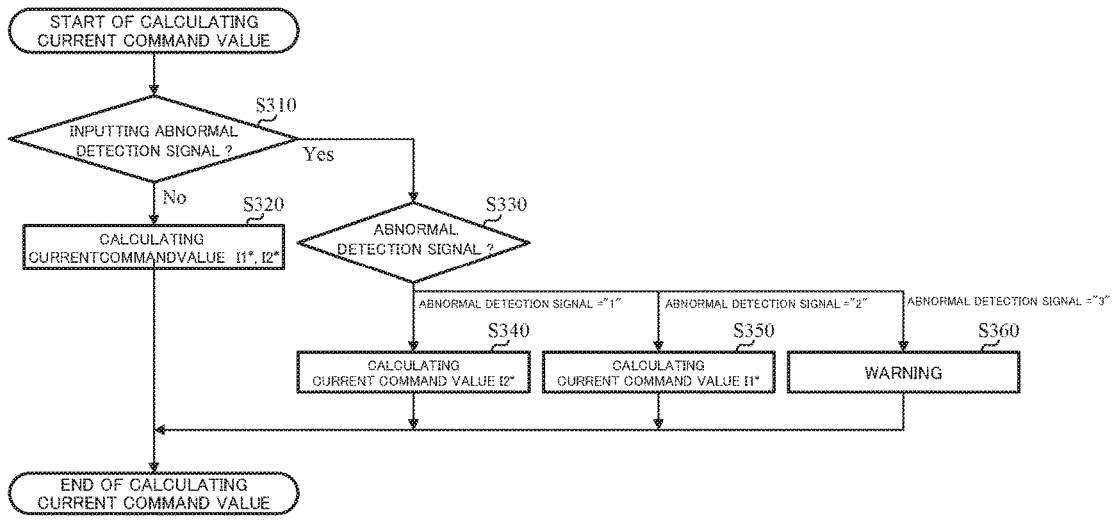
FIG. 12 is a flowchart showing an operating example of calculation of a current command value in the first embodiment.
Figure 13:
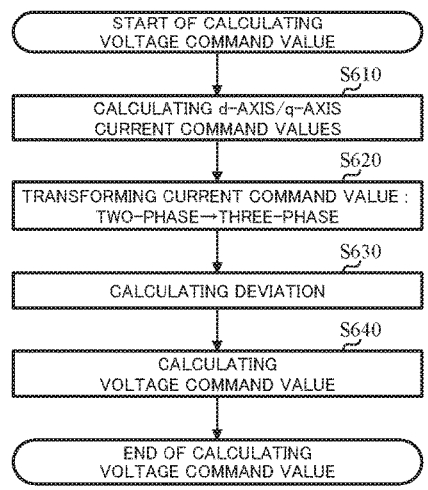
FIG. 13 is a flowchart showing an operating example of calculation of a voltage command value in the first embodiment.

In operations of the second embodiment, operations at the steps S340 and S350, shown in FIG. 12, in calculating the current command value in the current command value adjusting section of the first embodiment, are different. That is, when the current command value adjusting section has inputted the abnormal detection signal AD (Step S310), the current command value adjusting section checks the value of the abnormal detection signal AD (Step S330). When the value of the abnormal detection signal AD is "1", the current command value adjusting section judges that the abnormality has occurred in the first system, calculates only the current command value I2* on the basis of the expression 5 by using the preset first abnormal-time coefficient C2', the preset second abnormal-time coefficient C2", the steering assist command value Ir* and the compensation current command value Ic*, and outputs it to the current limiting section 150B. When the value of the abnormal detection signal AD is "2", the current command value adjusting section judges that the abnormality has occurred in the second system, calculates only the current command value I1* on the basis of the expression 6 by using the preset first abnormal-time coefficient C1', the preset second abnormal-time coefficient C1", the steering assist command value Ir* and the compensation current command value Ic*, and outputs it to the current limiting section 150A.

Though the first embodiment and the second embodiment comprise the current limiting sections and the current control sections for the respective systems, a configuration of getting the current limiting sections and the current control sections together respectively is possible. Getting them together can make the apparatus compact.

Figure 15:
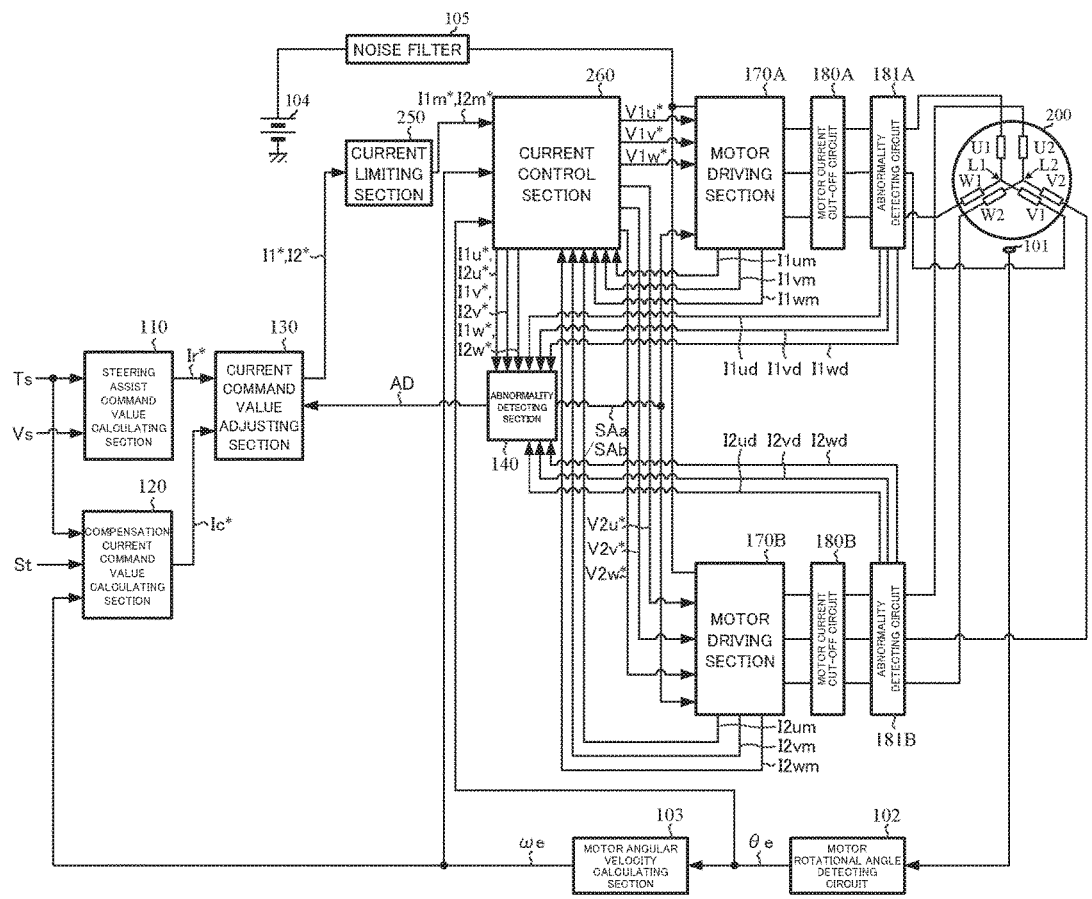
FIG. 15 is a block diagram showing a configuration example (a third embodiment) of the present invention.

A block diagram showing a configuration example (a third embodiment) of the electric power steering apparatus of the present invention that gets the current limiting sections and the current control sections together respectively for the first embodiment, is shown in FIG. 15. Compared with the first embodiment shown in FIG. 5, the number of the current limiting section and the current control section is one respectively, all input and output data for the current limiting sections 150A and 150B of the first embodiment become input and output data for the current limiting section 250, and all input and output data for the current control sections 160A and 160B of the first embodiment become input and output data for the current control section 260. The current limiting section 250 basically has the same configuration as the current limiting sections 150A and 150B, and the current control section 260 also basically has the same configuration as the current control sections 160A and 160B. However, in order to discriminate whether input and output data are data of the first system or data of the second system, such a measure is performed as to add data indicating the system to the input and output data, to provide respective systems with interfaces for input and output, to fix the order of input and output, and so on.

Operations of the third embodiment are the same as the first embodiment except operations of the current limiting section 250 and the current control section 260. The operation of the current limiting section 250 consists of the operation of the current limiting section 150A and the operation of the current limiting section 150B. That is, the current limiting section 250 inputs the current command values I1* and I2* which the current command value adjusting section 130 outputs, performs the steps S40 and S50 in the flowchart shown in FIG. 10, and outputs the current command values I1m* and I2m*. The operation of the current control section 260 consists of the operation of the current control section 160A and the operation of the current control section 160B. That is, the current control section 260 inputs the current command values I1m* and I2m*, the motor rotational angle θe which the motor rotational angle detecting circuit 102 outputs, the motor angular velocity ωe which the motor angular velocity calculating section 103 outputs, the three-phase motor current (I1um, I1vm and I1wm) which the motor driving section 170A outputs, and the three-phase motor current (I2um, I2vm and I2wm) which the motor driving section 170B outputs, performs the steps S60 and S70 in the flowchart shown in FIG. 10, and outputs the three-phase voltage command value (V1u*, V1v* and V1w*) to the motor driving section 170A, the three-phase voltage command value (V2u*, V2v* and V2w*) to the motor driving section 170B, and the three-phase current command values (I1u*, I1v* and I1w*, and I2u*, I2v* and I2w*).

In the embodiments (the first embodiment to the third embodiment) as mentioned above, though the current control section performs the two-phase/three-phase transformation from the dq-rotary coordinate system to the UVW-fixed coordinate system with respect to the current command value, the current control section may perform it with respect to the voltage command value. In this case, a three-phase/two-phase transforming section is needed that transforms the three-phase motor current fed back from the motor driving section and the three-phase detected motor current value detected by the abnormality detecting circuit into two-phase currents in the dq-rotary coordinate system respectively, the abnormality detecting section detects the abnormality by comparing the two-phase detected motor current value with the two-phase current command value. Further, though the above embodiments deal with the failure of the inverter in the motor driving section as the detected failure, the present invention can be applied to the case that the motor winding fails. Furthermore, though the star-connection is used as the method of connecting the coils, a delta-connection may be used.

EXPLANATION OF REFERENCE NUMERALS 1 steering wheel
2 column shaft (steering shaft, handle shaft)
10 torque sensor
12 vehicle speed sensor
14 steering angle sensor
20 motor
21, 101 rotational position sensor
30 control unit (ECU)
31 current command value calculating section
33, 150A, 150B, 250 current limiting section
35, 163A, 164A, 165A PI-control section
102 motor rotational angle detecting circuit
103 motor angular velocity calculating section
104 battery
105 noise filter
110 steering assist command value calculating section
120 compensation current command value calculating section
121 motor angular acceleration calculating section
122 loss torque compensating section
123 convergence control section
124 inertia compensating section
125 differential compensating section
126 SAT feedback compensating section
130 current command value adjusting section
140 abnormality detecting section
160A, 160B, 260 current control section
161A dq-axis current command value calculating section
162A two-phase/three-phase transforming section
170A, 170B motor driving section
171A, 171B current detecting circuit
172A, 172B inverter
173A, 173B gate driving circuit
174A, 174B power source cut-off circuit
180A, 180B motor current cut-off circuit
181A, 181B abnormality detecting circuit
200 three-phase motor (two-system winding motor)

The invention claimed is:

1. An electric power steering apparatus that assists and controls a steering system by calculating, for each of two system motor windings of a motor, a current command value and driving said motor based on said current command value calculated for said each of said two system motor windings, comprising:
a current command value adjusting section that calculates said current command value by using a steering assist command value and a compensation current command value,
wherein said current command value adjusting section has a normal-time coefficient used at normal time and an abnormal-time coefficient used at abnormal time that are set for said each of said two systems, a value obtained by multiplying a value obtained by adding said steering assist command value and said compensation current command value by said normal-time coefficient is said current command value when said two systems are normal, and a value obtained by adding said compensation current command value to a value obtained by multiplying said steering assist command value by said abnormal-time coefficient is said current command value to a normal system of said two systems when an abnormality occurs in one of said two systems.

2. The electric power steering apparatus according to claim 1,
wherein said electric power steering apparatus further comprises:
a steering assist command value calculating section that calculates said steering assist command value;
a compensation current command value calculating section that calculates said compensation current command value; and
an abnormality detecting section that detects said abnormality and outputs a signal that informs a system from among said two systems where said abnormality occurs when said abnormality occurs in said system; and
wherein said current command value adjusting section calculates said current command value based on presence of said signal and content of said signal by using said steering assist command value calculated in said steering assist command value calculating section and said compensation current command value calculated in said compensation current command value calculating section.

3. The electric power steering apparatus according to claim 1,
wherein said normal-time coefficient is more than or equal to 0.3 and less than or equal to 0.7, and said abnormal-time coefficient is more than or equal to 0.3 and less than or equal to 0.7.

4. The electric power steering apparatus according to claim 2,
wherein said normal-time coefficient is more than or equal to 0.3 and less than or equal to 0.7, and said abnormal-time coefficient is more than or equal to 0.3 and less than or equal to 0.7.

5. An electric power steering apparatus that assists and controls a steering system by calculating, for each of two system motor windings of a motor, a current command value and driving said motor based on said current command value calculated for said each of said two system motor windings, comprising:

a current command value adjusting section that calculates said current command value by using a steering assist command value and a compensation current command value, wherein said current command value adjusting section has a normal-time coefficient used at normal time and a first abnormal-time coefficient and a second abnormal-time coefficient used at abnormal time that are respectively set to said each of said two systems, a value obtained by multiplying a value obtained by adding said steering assist command value and said compensation current command value by said normal-time coefficient is said current command value when said two systems are normal, and a value obtained by adding a value obtained by multiplying said steering assist command value by said first abnormal-time coefficient and a value obtained by multiplying said compensation current command value by said second abnormal-time coefficient is said current command value to a normal system of said two systems when an abnormality occurs in one of said two systems.

6. The electric power steering apparatus according to claim 5, wherein said electric power steering apparatus further comprises:

a steering assist command value calculating section that calculates said steering assist command value;

a compensation current command value calculating section that calculates said compensation current command value; and an abnormality detecting section that detects said abnormality and outputs a signal that informs a system from among said two systems where said abnormality occurs when said abnormality occurs in said system; and wherein said current command value adjusting section calculates said current command value based on presence of said signal and content of said signal by using said steering assist command value calculated in said steering assist command value calculating section and said compensation current command value calculated in said compensation current command value calculating section.

7. The electric power steering apparatus according to claim 5, wherein said normal-time coefficient is more than or equal to 0.3 and less than or equal to 0.7, said first abnormal-time coefficient is more than or equal to 0.3 and less than or equal to 0.7, and said second abnormal-time coefficient is more than or equal to 0.7 and less than or equal to 1.2.

8. The electric power steering apparatus according to claim 6, wherein said normal-time coefficient is more than or equal to 0.3 and less than or equal to 0.7, said first abnormal-time coefficient is more than or equal to 0.3 and less than or equal to 0.7, and said second abnormal-time coefficient is more than or equal to 0.7 and less than or equal to 1.2.

* * * * *